Dec. 27, 1932.  F. W. FRINK  1,891,924
ELECTRIC POWER CONVERTING APPARATUS
Filed Nov. 22, 1930
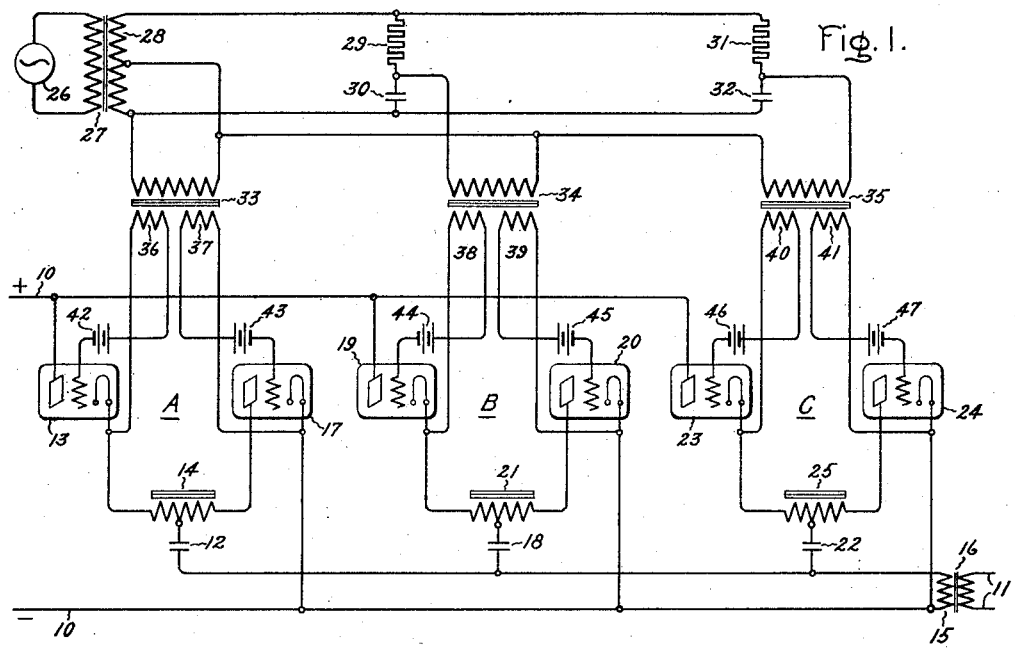
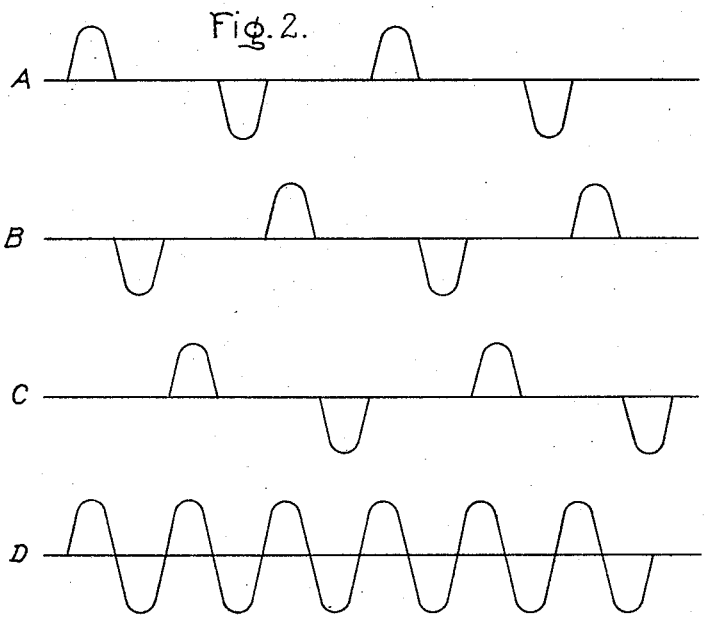
Inventor:
Frederick W. Frink,
by Charles E. Muller
His Attorney.

Patented Dec. 27, 1932

1,891,924

UNITED STATES PATENT OFFICE

FREDERICK W. FRINK, OF SCHENECTADY, NEW YORK, ASSIGNOR TO GENERAL ELECTRIC COMPANY, A CORPORATION OF NEW YORK

ELECTRIC POWER CONVERTING APPARATUS

Application filed November 22, 1930. Serial No. 497,501.

My invention relates to electric power converting apparatus and more particularly to such apparatus including electric valves for converting direct current into alternating current.

Heretofore there have been proposed numerous arrangements including electric valves for converting direct current into alternating current. It has been found that electric valves of the vapor electric discharge type are particularly suitable for such systems due to their relatively small energy losses and to the fact that a moderate power output may be obtained with ordinary operating voltages. The successful operation of vapor electric valves in such circuits is dependent upon the condition that their control grids shall regain control of their conductivity during each interval that a negative potential is impressed upon their anodes. In order for this condition to obtain, it is necessary that, after the current has been interrupted in a valve, the contained vapor shall have a sufficient time to become deionized before a positive potential is again impressed upon the anode of the valve, as will be well understood by those skilled in the art. However, when the above described circuits are used to convert direct current into alternating current of very high frequencies, it sometimes occurs that the rest period of the valves, i. e., the time between the interruption of current in the valves and the recurrence of a positive potential upon their anodes is insufficient to allow complete deionization.

It is an object of my invention to provide an improved electric power converting apparatus utilizing electric valves which shall overcome the above mentioned disadvantages of the arrangements of the prior art and which will be simple, economical and reliable in operation.

It is a further object of my invention to provide an improved electric power converting apparatus utilizing electric valves of the vapor discharge type capable of converting a direct current into alternating current of very high frequencies and in which the valves will have sufficient time for deionization.

An electric power converting apparatus which is particularly suitable for use in connection with my invention is illustrated in United States Letters Patent No. 1,752,247, granted March 25, 1930, upon an application of Alan S. FitzGerald. There is described in this patent an arrangement for converting direct current into alternating current known in the art as a series inverter and comprising a pair of electric valves, a capacitor, a circuit for charging the capacitor including one of the electric valves and a circuit for discharging the capacitor including the other electric valve, and an alternating current circuit common to the charging and discharging circuits. In accordance with my invention I provide a plurality of such electric power converting apparatus, or series inverters, connected to a common load circuit. The constants of the several circuit elements are so chosen that these inverters have natural frequencies of oscillation equal to that of the desired alternating current output, but the grids of the several electric valves are driven at a frequency which is a fraction of that of the power output and with a phase displacement between the grid excitation of the several inverters. The wave form of the grid excitation is preferably that of periodic impulses of very short duration, such for example as can be obtained from a transformer operating considerably beyond its saturation point. The result is that each inverter generates a series of half sine waves of current alternating in polarity, and separated by considerable intervals during which no current flows. The phase relations of the grid excitations of the several inverters are so adjusted that these half sine waves generated by the several apparatus combine into a single continuous alternating current of a frequency which is substantially an integral multiple of that of the grid excitation.

For a better understanding of my invention together with other and further objects thereof, reference is had to the following description taken in connection with the accompanying drawing and its scope will be pointed out in the appended claims. Fig. 1 of the accompanying drawing is a diagrammatic representation of my invention as applied to an arrangement for generating high frequency alternating current by means of three series inverters, while Fig. 2 illustrates the wave form of the current generated by the several inverters together with the composite wave form of the current delivered to the load circuit.

Referring more particularly to Fig. 1 of the drawing, I have illustrated an arrangement for receiving energy from the direct current circuit 10, converting it into alternating current and delivering it to the receiving circuit 11. This arrangement includes series inverters A, B and C, each energized from the direct current circuit 10 and supplying energy to the receiving circuit 11. The inverter A comprises a capacitor 12, provided with a circuit for charging it from the circuit 10, including an electric valve 13, the left hand portion of a reactor 14, capacitor 12, and the primary winding 15 of a power transformer 16, the secondary winding of which is connected to the load circuit 11. A discharge circuit is provided for capacitor 12 including the right hand portion of reactor 14, an electric valve 17 and primary winding 15. Similarly inverter B comprises a capacitor 18, electric valves 19 and 20, a reactor 21, and inverter C comprises a capacitor 22, electric valves 23 and 24 and a reactor 25. In order to provide excitation for the control grids of the valves of inverters A, B and C, I have provided a source of alternating potential 26 connected to an arrangement for splitting the single phase into three phase alternating potential, although a source of three phase potential may be used if desired. This arrangement comprises a transformer 27 having a secondary winding 28 provided with an electrical midpoint and a pair of circuits connected across this secondary winding 28 comprising a resistor 29, a capacitor 30 and a resistor 31 and a capacitor 32 respectively. A grid transformer 33 is provided for inverter A having a primary winding connected across a portion of secondary winding 28, while grid transformers 34 and 35 are provided for inverters B and C, respectively, with their primary windings connected between the midpoint of the secondary winding 28 and the junction between resistor 29 and capacitor 30 and resistor 31 and capacitor 32 respectively. Transformers 33, 34 and 35 are preferably designed to operate considerably beyond their saturation point with the result that the alternating potential induced in their secondary winding has a very peaked wave form, the width of this peak preferably not exceeding 15 or 20 electrical degrees. However, this feature of exciting the control grids of a vapor electric discharge valve with a periodic potential of peaked wave form comprises no part of my present invention but is disclosed and broadly claimed in the co-pending application of B. D. Bedford, Serial No. 485,335, filed September 29, 1930, and assigned to the same assignee as the present application. Electric valves 13 and 17 are provided with grid circuits including secondary windings 36 and 37 of the grid transformer 33 and negative bias batteries 42 and 43 respectively. Similarly, electric valves 19 and 20 are provided with grid circuits including secondary windings 38 and 39 of grid transformer 34 and negative bias batteries 44 and 45, respectively, and electric valves 23 and 24 are provided with grid circuits including the secondary windings 40 and 41 of grid transformer 35 and the negative bias batteries 46 and 47 respectively.

In general, the operation of inverters A, B and C will be well understood by those skilled in the art or may be found explained in detail in Patent No. 1,752,247 referred to above. Briefly the operation of inverter A, for example, comprises the charging of the capacitor 12 from the direct current circuit 10 through electric valve 13, the left hand portion of reactor 14 and the primary winding 15 of transformer 16. This charging current is represented by the initial impulse of curve A Fig. 2. As stated above, the constants of the inverter A are so chosen that its natural period of oscillation is considerably higher than that of the grid excitation with the result that electric valve 17 is not rendered conducting until a considerable interval after current stopped flowing in electric valve 13. When electric valve 17 is made conducting by the reversal of the grid excitation, the capacitor 12 discharges through the right hand portion of reactor 14, electric valve 17 and the primary winding 15 of transformer 16. This discharging of the capacitor results in the second impulse of curve A, Fig. 2, which is negative with respect to that of the first impulse. This cycle is repeated indefinitely. With the arrangement illustrated, the natural frequency of the inverters A, B and C should be substantially three times that of the grid excitation, with the result that each impulse of current delivered to the output transformer 16 has a duration of substantially 60 electrical degrees with respect to the frequency of the grid excitation. The grid excitation of the inverters B and C are retarded 120 degrees and 240 degrees respectively with respect to the frequency of the grid excitation delivered by the source 26 and their outputs are shown by the curves B and C of Fig. 2. The curve D of Fig. 2 illustrates how the outputs of inverters A, B and C combine to give a sine wave of alternating current of a frequency three times that of the grid excitation. It will be obvious to those skilled in the art that the above described arrangement may be extended by utilizing a larger number of inverters similar to A, B and C in order to secure a higher frequency. In general, if n inverters be used, they must be tuned to a frequency n times that of the grid excitation and the output of the combination will be a sine wave of alternating current also having a frequency n times that of the grid excitation. However, in order for the impulses of the several inverters to combine properly, it is necessary that the frequency delivered by the combination shall be substantially an odd integral multiple of the frequency of the grid excitation.

While I have described what I at present consider the preferred embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, a direct current supply circuit, a plurality of resonant circuits, each including a capacitor, a pair of electric valves, a charging circuit for said capacitor including one of said valves, and a discharging circuit for said capacitor including the other of said electric valves, means for periodically and alternately rendering the valves included in each resonant circuit conductive, means for producing a phase displacement between the conductivity cycle of the valves included in the several resonant circuits, the natural frequency of said resonant circuits being substantially an integral multiple of that of said conductivity controlling means, and a load circuit associated with the several capacitor charging and discharging circuits.

2. In combination, a supply circuit, a plurality of series inverters connected in parallel across said circuit, means for exciting said inverters with periodic potentials of the same frequency but displaced in phase, said inverters being tuned to a frequency higher than that of said exciting potentials whereby the output of each inverter comprises a series of time displaced positive and negative current impulses, and means for combining the output of said inverters to supply a single periodic current output of a frequency substantially equal to that to which said inverters are tuned.

In witness whereof, I have hereunto set my hand this 21st day of November, 1930.

FREDERICK W. FRINK.